United States Patent [19]

Krug et al.

[11] Patent Number: 5,716,679
[45] Date of Patent: Feb. 10, 1998

[54] OPTICAL ELEMENTS CONTAINING NANOSCALED PARTICLES AND HAVING AN EMBOSSED SURFACE AND PROCESS FOR THEIR PREPARATION

[75] Inventors: Herbert Krug, Püttlingen; Rüdiger Nass, Riegelsberg; Helmut Schmidt, Saarbrücken-Güdingen; Lubomir Spanhel, Saarbrücken-Dudweiler, all of Germany

[73] Assignee: Institut Für Neue Materialien Gemeinnützige GmbH, Saarbrücken, Germany

[21] Appl. No.: 196,213

[22] PCT Filed: Sep. 11, 1992

[86] PCT No.: PCT/EP92/02094

§ 371 Date: Aug. 3, 1994

§ 102(e) Date: Aug. 3, 1994

[87] PCT Pub. No.: WO93/06508

PCT Pub. Date: Apr. 1, 1993

[30] Foreign Application Priority Data

Sep. 13, 1991 [DE] Germany .................. 41 30 550.7
Sep. 11, 1992 [WO] WIPO ............... PCT/EP92/02094

[51] Int. Cl.$^6$ .................. B05D 5/06; B05D 3/06; C08J 7/04; C08F 2/48

[52] U.S. Cl. ............... 427/515; 427/164; 427/277; 427/517

[58] Field of Search ................ 427/162, 164, 427/277, 278, 510, 515, 517, 519, 521, 522; 428/323, 328, 329, 330, 331, 339; 264/1.31

[56] References Cited

U.S. PATENT DOCUMENTS

| | | | |
|---|---|---|---|
| 3,986,997 | 10/1976 | Clark | 428/412 |
| 4,355,135 | 10/1982 | January | 524/767 |
| 4,496,957 | 1/1985 | Smith et al. | 346/135.1 |
| 4,631,222 | 12/1986 | Sander | 428/172 |
| 4,895,767 | 1/1990 | Mori et al. | 428/447 |
| 4,913,845 | 4/1990 | Gillberg-LaForce et al. | 252/582 |
| 5,003,915 | 4/1991 | D'Amato et al. | 118/46 |
| 5,073,404 | 12/1991 | Huang | 427/164 |

*Primary Examiner*—Shrive Beck
*Assistant Examiner*—Fred J. Parker
*Attorney, Agent, or Firm*—Oblon, Spivak, McClelland, Maier & Neustadt, P.C.

[57] ABSTRACT

Optical elements comprising a substrate and a transparent composite material layer having an embossed surface, the composite material comprising a polymer matrix having incorporated therein inorganic components in the form of nanoscaled particles, and methods of preparation thereof which comprise mixing a polymer precursor with a sol of nanosealed particles in an organic solvent and a polymerizable initiator, applying the mixture to a substrate to form a coating, and embossing the coating while simultaneously curing it.

8 Claims, No Drawings

OPTICAL ELEMENTS CONTAINING NANOSCALED PARTICLES AND HAVING AN EMBOSSED SURFACE AND PROCESS FOR THEIR PREPARATION

FIELD OF THE INVENTION

The invention relates to optical elements with an embossed surface structures, e.g. optical diffraction gratings, interferometers, Fresnel lenses, launching gratings and output gratings for integrated optics, optical filters, couplers, branching elements, multiplexers, microstrips, optical switches and sensors, compact disks, Bragg mirrors and holographic elements.

BACKGROUND OF THE INVENTION

The production of such optical elements made of transparent polymers such as polymethylmethacrylate (PNMA) or polycarbonates is already known. One drawback with these polymers is, however, their relatively high thermal shrinkage of approximately 15% by volume, which does not allow the material to be embossed with high precision near the final shape. Inorganic/organic composite materials have also been already proposed as the materials, but here the shrinkage is up to 50% by volume.

SUMMARY OF THE INVENTION

Surprisingly it has now been found that optical elements made of specific composite materials can be embossed with high precision and dimensions that are close to the final shape according to a special process with unusually low shrinkage (maximum 3 to 5% by volume).

DESCRIPTION OF THE PREFERRED EMBODIMENTS

The subject matter of the invention are optical elements having an embossed surface structure, which are characterized by the fact that the embossed surface is made of a transparent composite material, which exhibits in a polymer matrix a three dimensional skeleton comprising inorganic or organically modified inorganic components in the form of nanoscaled particles.

Suitable polymer matrices are any transparent plastics, which are known for optical application, such as polyacrylic acid, polymethacrylic acid, polyacrylates, polymethacrylates, polyolefins, polystryene, polyamides, polyimides, polyvinyl compounds, such as polyvinyl chloride, polyvinyl alcohol, polyvinyl butyral, polyvinyl acetate, and corresponding copolymers, such as poly (ethylene-vinyl acetate), polyester, such as polyethylene terephthalate or polydiallyl phthalate, polyarylates, polycarbonates, polyethers such as polyoxymethylene, polyethylene oxide or polyphenylene oxide, polyether ketones, polysulphones, polyepoxides, fluoropolymers, such as polytetrafluoroethylene, and organo-polysiloxanes.

A relatively "stiff" three dimensional skeleton comprising inorganic or organically modified inorganic components in the form of nanoscaled particles is incorporated into this polymer matrix.

Nanoscaled particles are, for example. oxides (including oxide hydrates, oxide/hydroxides and hydroxides) and other chalcogenides such as sulfides, selenides and tellurides; halogenides (fluorides, chlorides, bromides or iodides); antimonides; arsenides; carbides; nitrides; phosphides; phosphates; silicates, zirconates; aluminates; stannates; or corresponding mixed oxides.

Specific examples are oxides such as ZnO, CdO, $SiO_2$, $TiO_2$, $ZrO_2$, $Ce_{O2}$, $SnO_2$, $Al_2O_3$, $In_2O_3$, $La_2O_3$, $Fe_2O_3$, NiO, $Cu_2O$; $V_2O_5$, $MoO_3$ or $WO_3$; sulfides such as CdS, ZnS, PbS or $Ag_2S$; selenides such as GaSe, CdSe or ZnSe; and tellurides such ZnTe or CdTe; halogenides such as AgCl, AgBr, AgI, CuCl, CuBr, $CdI_2$ or $PbI_2$; carbides such as $CeC_2$ or SiC; arsenides such as AlAs. GaAs or GeAs; antimonides such as InSb; nitrides such as BN, AlN, $Si_3N_4$ or $Ti_3N_4$; and phosphides such as GaP, InP, $Zn_3P_2$ or $Cd_3P_2$; and mixed oxides with perovskite structure such as $BaTiO_3$, $PbTiO_3$ or $PbTiO_3$.

These nanoscaled particles can be produced in the conventional manner, e.g. by means of flame pyrolysis and plasma process [see A. N. Dubrovina et al., Kristallografiya. 26 (1981) 637–639], Kolloidtechniken [see E. Matijevic, "Preparation and Interactions of Colloids of Interest in Ceramics" in "Ultrastructure Processing of Advanced Ceramics", Eds.: J. D. Mackenzie, D. R. Ulrich, John Wiley & Sons, New York (1988) 429, and other publications by E. Matijevic et al.], sol-gel processes [see R. Naβ, H. Schmidt, Journal of Non-Crystalline Solids 121 (1990) 329–333; M. A. Anderson et al., Journal of Membrane Science, 39 (1988) 243–258], controlled nucleation and growth processes [see L. Spanhel and M. A. Anderson, 3. Amer. Chem. Soc. 113 (1991) 2826–2835], MOCVD process [see G. B. Springfellow "Organometallic Vapor Phase Epitaxy: Theory and Practice", Academic Press, New York (1989) and emulsion process [see DE 4118185 A1].

The applied nanoscaled particles have usually a particle size ranging from 0.5 to 20 nm, preferably from 2 to 20 nm. The volume percentage of the inorganic or organically modified inorganic component in the composite materials is usually 5 to 80% by volume, preferably 10 to 50% by volume, and in particular 20 to 30% by volume. The polymer matrix makes up in essence the residual volume percentage.

In the case of the optical elements according to the invention, at least the surface layer to be embossed is made of said composite material. This surface layer can be situated on a substrate, suitable for optical applications, which can be made, e.g, of glass, ceramic, silicon, metal, semi-conductor materials or plastics.

The substrate has preferably a surface of optical quality (roughness preferably <50 nm). To improve the adhesion of the surface layer to be embossed, the substrate can be pre-treated, e.g., with a primer or an adhesive agent (silanes etc.).

Depending on the application purpose, the embossed surface of the optical elements can be provided with another layer, e.g. a metal layer, protective layer or other functional layer, in order to obtain increased reflection or other effects (e.g. absorption of specific chemical substances).

The optical elements can be produced by different methods, e.g. by a) mixing a compound, which can be cured or polymerized thermally or photochemically into a transparent polymer, with a sol of nanoscaled particles in an organic solvent and a polymerization initiator, b) applying the mixture on a substrate, optionally after adjusting a suitable viscosity, and optionally drying, c) embossing with a punch the coating obtained while simultaneously curing thermally or photochemically and d) conducting optionally a post-curing.

The compound that can be cured or polymerized thermally or photochemically is usually a monomer, oligomer or prepolymer, which exhibits polymerizable, unsaturated groups and affords one of the aforementioned transparent polymers during thermally or photochemically initiated polymerization or curing.

This compound can be added to an organic solvent either as such or preferably as a solution. Examples of suitable solvents are alcohols, ketones, and esters.

In addition to the polymerizable or curable compound, a solution of a transparent polymer that dissolves in organic solvents can be added, whereby the proportion of this polymer is in the case of the application at least 1% by wt. and a maximum of 95% by wt., preferably a maximum of 50% by wt., based on the total amount of polymer and polymerizable or curable compound. Said starting components for the polymer matrix are mixed with a sol of nanoscaled particles in an organic solvent. The solvent used in this case is either identical to the solvent used for the polymer components or can be mixed with the same.

The sol of the nanoscaled particles can be produced either from pro-finished particles (e.g. by means of ultrasonic dispersion) or they are prepared in situ, e.g. by means of a sol-gel reaction of hydrolyzable and condensible compounds of the elements of the main groups III to V (preferably III and IV), the auxiliary groups III to VI of the periodic system and/or lanthanoid elements.

The hydrolyzable and condensible starting compounds are preferably those of Si, Al, B, Pb, Sn, Ti, Zr, V and Zn, in particular those of Bi, Al, Ti and Zr or mixtures thereof. It should be noted here that naturally other hydrolyzable compounds can also be added, in particular those from elements of the main groups I and II of the periodic system (e.g. Na, K, Ca and Mg) and the auxiliary groups VII and VIII of the periodic system (e.g. Mn, Fe, Co and Ni). Hydrolyzable compounds of the lanthanoid elements can also be used. Preferably said compounds do not constitute more than 20 and in particular no more than 10 mole % of the total hydrolyzable monomeric compounds that are added.

Examples of hydrolyzable groups in the starting compounds (that cannot be used necessarily as monomeric compounds, but rather can already be used as suitable precondensates) are halogen (F, Cl, Br and I, in particular Cl and Br), alkoxy (in particular $C_{1-4}$ alkoxy, such as methoxy, ethoxy, n-propoxy, i-propoxy and butoxy), aryloxy (in particular $C_{6-10}$ aryloxy, such as phenoxy), acyloxy (in particular $C_{1-4}$ acyloxy, such as acetoxy and propionyloxy) and alkyl carbonyl (e.g. acetyl).

Besides the aforementioned hydrolyzable groups, examples of other equally suitable groups are hydrogen and alkoxy groups having 5 to 20, in particular 5 to 10 carbon atoms and halogen- and alkoxy-substituted alkoxy groups (such as β-methoxyethoxy).

Since the hydrolyzable groups are virtually no longer present in the end product, but rather are lost through hydrolysis, whereby the hydrolysis product also has to be removed sooner or later in some suitable manner, such hydrolyzable groups are especially preferred that carry no substituents and lead to hydrolysis products with low molecular weight, such as low alcohols like methanol, ethanol, propanol, n-butanol, iso-butanol, sec-butanol and tert-butanol. The latter groups are at so preferred because they virtually do not influence the pH value during hydrolysis (in contrast to halogen, for example), a feature that is advantageous, because the pH value of the starting mixture is preferably in the range of 4 to 9, in particular 5 to 6.5; and hydrolysis products that shift the pH value noticeably out of this range are neutralized preferably through the addition of suitable substances (acids or bases).

The non-hydrolyzable groups of the added compounds are preferably selected from alkyl (in particular $C_{1-4}$ alkyl, such as methyl, ethyl, propyl and butyl), alkenyl (in particular C2–4 alkenyl, such as vinyl, 1-propenyl, 2-propenyl and butenyl), alkenyl (in particular $C_{2-4}$ alkenyl, like acetylenyl and propargyl) and aryl (in particular $C_{6-10}$ aryl, such as phenyl and naphthyl), where the aforementioned groups may or may not exhibit one or more substituents, such as halogen, hydroxy, alkoxy, epoxy, optionally substituted amino, etc. The above alkyl groups also include the respective cyclic and aryl-substituted groups, such as cyclohexyl and benzyl, whereas the alkenyl and alkenyl groups can also be cyclic and said aryl groups are also to include alkaryl groups (like tolyl and xylyl). Especially preferred non-hydrolyzable groups are those that have a (repeatedly) unsaturated carbon-carbon bond. Examples thereof are in particular groups that have a (methyl)acryloxy group, in particular a (meth)acryloxy-$C_{1-4}$ alkyl group, such as (meth) acryloxypropyl. The presence of such unsaturated groups has the advantage that following the application of the composite materials on a substrate a two-fold curing can take place, viz. a thermally or photochemically induced linking of the unsaturated organic groups through (radical) polymerization and a thermal completion of polycondensation (e.g. through elimination of water from still present central atom-OH-groups).

According to the invention it is preferred that 1 to 100, in particular 5 to 85 and especially preferred 20 to 70 mole % of the non-hydrolyzable groups exhibit at least one carbon-carbon double or triple bond.

Especially for compounds that in comparison to silicon compounds are very reactive during hydrolysis (such as compounds of Al, Zr, and Ti) it can be advisable to add the appropriate starting compounds in complexed form in order to avoid spontaneous precipitation of the corresponding hydrolysates following the addition of water. Suitable complexing agents are in particular organic (optionally unsaturated) carboxylic acids (such as alkanic acids like acetic acid, propionic acid and stearic acid, or alkenoic acids like acrylic acid, methacrylic acid and oleic acid), β-diketones (such as acetylacetone) and β-carbonyl carboxylic acid esters (such as ethyl acetoacetate). However, all other complexing agents known in this field can also be used, e.g. primary, secondary or tertiary amines like allylamines, ethylenediamines and diethylenetriamines.

The compound to be hydrolyzed (for example aluminum compound) may or may riot be added mixed with the complexing agent; i.e. the complexing takes places in situ.

By adding a complexed starting compound of, e.g., Al, Ti or Zr in combination with a reaction-carrying compound, e.g., an alkoxy silane like 3-methacryloxypropyltrimethoxysilane, it is possible to obtain a specifically adjustable particle size of the Al, Ti or Zr particles, The hydrolysis and condensation can take place in the manner typical for sol-gel reactions. For reaction-carrying starting compounds (e.g. silicon compounds) the hydrolysis can take place in most cases by adding water directly to the compound(s), which is/are to be hydrolyzed and is/are present either as such or dissolved in a suitable solvent, (preferably while stirring); and the resulting mixture is subsequently stirred for some time (some minutes up to some hours). In the presence of the reactive compounds of, e.g., Al, Ti and Zr a step-by-step addition of water is usually advisable. Independently of the reactivity of the compounds that are present, the hydrolysis does not usually occur at a temperature over 50° C., preferably between 0° C. and 30°

C. or the boiling point of the solvent that may or may not be added. In principle no solvent has to be added, especially if the hydrolyzable groups are ones that lead during hydrolysis to the formation of alcohols, such as methanol, ethanol, propanol and butanol. Otherwise suitable solvents are, e.g. the said alcohols and ethers, preferable low dialkyl ethers such as diethyl ether and dibutyl ether and THF, aromatic hydrocarbons (e.g. toluene), esters like ethyl acetate, and in particular butoxyethanol.

It must be pointed out with respect to the amount of water to be used in total for the hydrolysis that it is especially preferred, if the molar ratio of the total added water to the hydrolyzable groups in all of the added starting compounds ranges from 1:1 to 0.3:1, in particular 0.7:1 to 0.5:1.

The hydrolysis and condensation are conducted until there is a sol with particles in the specified particle size range of 0.5 to 20 nm.

The mixture to be applied on the substrate also contains a polymerization initiator, which can induce thermically and/or photochemically the polymerization and curing of the unsaturated compound.

The commercially available starters can be added, e.g., as the photo initiators. Examples are Irgacure$^R$ 184 (1-hydroxycyclohexylphenylketone) Irgacure$^R$ 500 (1-hydroxycyclohexylphenylketone, benzophenone) and other photo initiators of the Irgacure$^R$ type that are available from the Ciba-Geigy company; Darocur$^R$ 1173, 1116, 1398, 1174 and 1020 (available from Merck Company), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benyldimethylketal, 1,1,1-trichloroacetophenone, diethoxyacetophenone, and dibenzosuberone.

Suitable thermal initiators are, among others, organic peroxides in the form of diacylperoxides, peroxydicarbonates, alkyl peresters, dialkyl peroxides, perketals, ketone peroxides, and alkyl hydroperoxides. Concrete examples of such thermal initiators are dibenzoylperoxide, tert. butylperbenzoate and azobisisobutyronitrile.

The polymerization initiator is usually used in an amount of 0.1 to 5, preferably 0.5 to 3% by wt., based on the mixture.

The mixture may or may not contain other additives that are customary in optical systems, e.g. substances that influence the refractive index or other optical properties, like dyes, photochromic or thermochromic substances.

The mixture obtained can be applied on the substrate either as such or following partial or almost total removal of the solvent used or the solvent, formed during the reaction (e.g. alcohols resulting from hydrolysis of the alkoxides) or, however, following addition of a suitable solvent for the purpose of reducing the viscosity, The coating process can be done according to conventional methods, e.g. by immersion, flooding, blade coating, centrifuging, or spraying. Blade coating, spraying and centrifuging are especially preferred according to the invention. The applied composition is dried preferably (at room temperature or slightly raised temperature). Preferred layer thickness the dried state) ranges from 0.2 to 30 µm, These values can, however, be higher especially in the case of multiple coatings, Following the optional drying process, the coating applied on the substrate is cured thermally and/or through radiation (e.g. with an ultraviolet radiator, a laser, etc.) as a function of the kind of polymerization initiator that is used, and is simultaneously embossed with a punch.

The curing conditions (temperature, ultraviolet wavelength, etc.) depend on the decay conditions of the polymerization initiator. The thermal curing occurs usually at temperatures below 350° C., preferably below 150° C.

The heat is supplied inductively or e.g. through infrared lamps via the punch, the substrate. The irradiation with ultraviolet light or visible light takes place preferably through a transparent substrate. If, however, a suitably transparent punch is used, the irradiation can also occur through said punch.

The curing can be done in multiple steps, e.g. as precuring during embossing, followed by curing after removal of the punch. Optionally the surface can also be precured prior to applying the punch, in order to achieve higher viscosity.

Commercially available punches, e.g. made of metal, glass, ceramic or plastic, can be used that exhibit the desired embossing pattern as lines, dots, picture patterns etc.

The embossing pressure to be applied depends on the viscosity of the uncured surface and the respective structure of the punch.

The optical elements according to the invention are characterized by minimal shrinkage during the embossing/curing process. It involves so-called "near net shape" materials.

The elements that are produced are suitable, e.g. as optical diffraction gratings, interferometers, Fresnel lenses, launching gratings and output gratings for integrated optics, optical filters, couplers, branching elements, multiplexers, strip waveguides, optical switches and sensors, compact disks, Bragg mirrors and holographic elements.

EXAMPLE 1

1 mole of 3-methacryloxypropyltrimethoxysilane (MEMO) is reacted in 3 mole of methanol with 1.5 mole of bidistilled water for 1 hour at 50° C. Following cooling below 0° C., 0.1 to 0,3 mole of zirconium tetrapropylate are added together with 0.1 to 0.6 mole of methacrylic acid. After 1.5 hours, up to 0.6 mole of bidistilled water are added following a check of the water content; and the mixture is stirred for 12 hours at room temperature, To coat substrates, here vitreous silica, 0.2 to 2% by wt., preferably 1% by wt. of photo initiator are added to the lacquer obtained in this manner. The choice of photo initiator is based on the emission spectrum of the ultraviolet lamps that are used to cure the layer. In the case of ultraviolet lamps emitting radiation in the range of 250 nm, Irgacure 184 (Ciba-Geigy) is used, for example, as the photo initiator. The lacquer obtained in this manner can be filtered with membrane filters having pore sizes ranging from 0.2 to 0.8 µm. Suitable kinds of coating procedures are, e.g, blade coating, immersion, centrifuging and spraying, whereby water-soluble solvents like 2-propanol can be added in order to adjust the parameters that are optimal with respect to lacquer (for example the viscosity).

In a special arrangement the punch is put on the coated substrates (layer thicknesses in the range of 0.2 to 10 µm) and pushed down with a defined force of 10 to 200 Newtons (for a punch area of approximately 3 cm$^2$) during the first step of the curing process. In so doing, the irradiation with ultraviolet light causes the polymerization of the existing unsaturated organic groups. The ultraviolet source is arranged below the substrate, so that the radiation impinges on the lacquer layer through the vitreous silica. With the 100 watt ultraviolet light source that is used here irradiation periods of 15 to 40 minutes are adequate for partial curing of the layer.

After the punch is detached, the coated substrates are post-cured in a continuous irradiation apparatus, in order to complete the polymerization, at a speed of 0.5 to 2 meters per minute, preferably 1 meter per minute, passed below 1 or 2 ultraviolet tubes each exhibiting 1200 watts of power, whereupon the lacquer is dry to the touch.

The last step of the curing procedure consists of a 1 hour treatment at 130° C. in a forced air oven.

EXAMPLE 2

1 mole of MEMO is added to 1.5 mole bidistilled water and the resulting mixture is subsequently stirred for 12 to 50 hours at room temperature.

The lacquer is filtered as in example 1, a photo initiator is added and the mixture is eventually diluted.

The subsequent coating procedure, embossing operation and the curing are conducted analogously to example 1.

EXAMPLE 3

The same lacquer is used as in example 1, but instead of the ultraviolet photo initiator, 0.5 to 5% by wt., preferably 0.5 to 2% by wt., of a thermal starter, e.g. tert. butoxyperbenzoate, are added. The entire curing is conducted within one hour in an oven at 130° C. during the embossing process.

EXAMPLE 4

The same lacquer is used as in example 2 for the embossing procedure with purely thermal curing as in example 3.

EXAMPLE 5

One procedes as in example 1, but, instead of the ultraviolet photo initiator, an initiator is used that absorbs in the near ultraviolet up to visible range of the spectrum (e.g. Irgacure 369), so that glass substrates can be used, instead of vitreous glass.

EXAMPLE 6

One procedes as in example 2, but 10–30% methylmethacrylate (MMA) is added following complete synthesis.

EXAMPLE 7

7.1 ZnO sol preparation 0.1M of zinc acetate dihydrate are dissolved in ethanol at 80° C. After the $Zn(Ac)_2 \cdot 2H_2O$ has been completely dissolved, the temperature is raised to 85° C. and distilled for a duration of 3 hours 20 minutes (measured starting from complete dissolution of the zinc acetate). The distillation conditions are adjusted in such a manner that during the aforementioned reaction time 650 ml of solvent are distilled over. The remaining 100 ml of the batch are filled to 750 ml with ethanol and cooled in the refrigerator. 0.014M of lithium hydroxide monohydrate are added to the batch that is cooled in this manner and hydrolyzed in the ultrasonic bath. In so doing, the mixture is cooled with ice so that the batch reaches at most the room temperature. The sol prepared in this manner is extracted via a glass fiber filter and rotated up to 100 ml at approximately 30 mbar at the rotary evaporator at room temperature. The resulting optically transparent solution contains approximately 8% by wt. of ZnO. The average cluster diameter is about 3 nm.

7.2 Preparation of polymethylmethacrylate/ZnO composite 20 g of polymethylmethacrylate are dissolved in 100 ml of methyl methacrylate while stirring. Ethanol is added to this solution (60% by volume). The ZnO sol is now added drop-by-drop by means of a dropping funnel to the MMA/ethanol PMMA solution while stirring vigorously. The resulting solution is optically transparent. The weight content of the zinc oxide in these solutions can be adjusted between 5 and 60% without impairing the optical transparency. Finally the polymer-ZnO mixture is applied on different substrates (vitreous glass, polymers or ceramics) as in the above examples and embossed and cured.

What is claimed is:

1. A process for preparing an optical element which comprises
   a) mixing a compound, which can be cured or polymerized thermally or photochemically to form an optically transparent polymer, with a sol of nanoscaled particles having a particle size ranging from 0.5 to 20 nm, said nanoscaled particles being present in a sufficient amount to reduce the thermal shrinkage of the mixture relative to the thermal shrinking of the compound alone, in an organic solvent and a polymerization initiator, to form a mixture,
   b) applying the mixture on a substrate to form a coating on the substrate, and optionally drying the coating,
   c) embossing the coating on the substrate with a punch while simultaneously curing the coating thermally or photochemically and
   d) optionally conducting a post-curing, wherein an optical element with an embossed, optically transparent coating is formed, said coating comprising a polymer matrix having incorporated therein nanoscaled particles.

2. The process as claimed in claim 1, wherein in step (a) the compound is present as a solution in an organic solvent.

3. The process as claimed in claim 1, wherein in addition, a solution of an optically transparent polymer that is soluble in the organic solvent is added to the mixture in step (a).

4. The process as claimed in claim 1, wherein the substrate is primed with a primer prior to applying the mixture.

5. The process as claimed in claim 1, wherein the embossed surface is coated with a metal layer and/or protective layer.

6. The process as claimed in claim 1, wherein the polymer matrix formed from the compound when cured or polymerized thermally or photochemically is selected from the group consisting of poly(meth)acrylic acid, poly(meth)acrylates, polyolefins, polystyrene, polyamides, polyimides, polyvinyl compounds, polyesters, polyacrylates, polycarbonates, polyethers, polyether ketones, polysulphones, polyepoxides, fluoropolymers and organo-polysiloxanes.

7. The process as claimed in claim 1, wherein the nanoscaled particles are selected from the group consisting of oxides, sulfides, selenides, tellurides, halogenides, carbides, arsenides, antimonides, nitrides, phosphides, phosphates, silicates, titanates, zirconates, stannates, and aluminates.

8. The process as claimed in claim 1, wherein the nanoscaled particles are formed from hydrolyzed and condensed compounds of the elements selected from the group consisting of the main groups III to V, the auxiliary groups III to VI of the periodic system, Zn, and the lanthanoid elements.

* * * * *